United States Patent
Kuhns et al.

(10) Patent No.: US 7,097,427 B2
(45) Date of Patent: Aug. 29, 2006

(54) HELICOPTER MAIN ROTOR BLADE BALANCE WEIGHT RETENTION ASSEMBLY

(75) Inventors: Norman Kuhns, Euless, TX (US); Ajay Sehgal, Leonardtown, MD (US); Ernest Powell, Bedford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 327 days.

(21) Appl. No.: 10/483,641

(22) PCT Filed: Aug. 2, 2002

(86) PCT No.: PCT/US02/24729

§ 371 (c)(1),
(2), (4) Date: Jan. 13, 2004

(87) PCT Pub. No.: WO03/011689

PCT Pub. Date: Feb. 13, 2003

(65) Prior Publication Data

US 2004/0222329 A1 Nov. 11, 2004

(51) Int. Cl.
*B64C 27/51* (2006.01)
(52) U.S. Cl. .................... 416/144; 416/146 R; 416/500
(58) Field of Classification Search ............... 416/144, 416/146 R, 500; 74/573 R, 574; 244/17.13, 244/17.11
See application file for complete search history.

(56) References Cited

U.S. PATENT DOCUMENTS

| | | | | |
|---|---|---|---|---|
| 3,999,888 A | * | 12/1976 | Zincone | 416/145 |
| 5,273,398 A | * | 12/1993 | Reinfelder et al. | 416/144 |
| 5,346,367 A | * | 9/1994 | Doolin et al. | 416/230 |
| 6,139,271 A | * | 10/2000 | Chadwick | 416/145 |

* cited by examiner

Primary Examiner—Ninh H. Nguyen
(74) Attorney, Agent, or Firm—James E. Walton (57) ABSTRACT

A helicopter main rotor blade balance weight retention system and assembly having a base plate (105), at least one support post (107) integral with the base plate and extending out perpendicularly from the base plate, a plurality of balance weights (109), a retaining nut plate (111), and one or more fastening bolts (113) for securing the balance weights to the base plate, and the base plate to the rotor blade. The balance weights (109) include apertures (117, 119) through which the support posts and the fastening bolts pass. The apertures through which the support posts pass are dimensioned such that the a snug fit is formed between the support posts and the balance weight; but the apertures through which the fastening bolts pass are dimensioned such that the threaded portions of the fastening bolts are not subjected to any shear loads from the balance weights due to the centrifugal force generated by the rotating rotor blades. The weight retention assembly is installed into pockets in the blade tip.

14 Claims, 5 Drawing Sheets

HELICOPTER MAIN ROTOR BLADE BALANCE WEIGHT RETENTION ASSEMBLY

GOVERNMENT LICENSE RIGHTS

The U.S. Government has a paid-up license in this invention and the right in limited circumstances to require the patent owner to license others on reasonable terms as provided for by the terms of Contract No. NOOO19-96-C-0128 awarded by NAVAiR.

TECHNICAL FIELD

The present invention relates generally to helicopter rotor blades. In particular, the present invention relates to systems and assemblies for retaining balance weights for adjusting the spanwise and chordwise balance of the rotor blades.

DESCRIPTION OF THE PRIOR ART

It is important that helicopter rotor blades are balanced properly in both spanwise and chordwise directions. Improperly balanced blades not only cause excessive vibrations due to imbalance, but also cause increased loads in critical dynamic components. The end result is degraded flying qualities and reduced component lives due to premature fatigue failure.

The blades require both spanwise and chordwise balance. For static balance, the rotor blade is balanced relative to a master blade prior to installation of the rotor blade onto the helicopter. For dynamic balance, the blade is balanced either on a whirl stand or on the helicopter against a master blade or other blades it would fly with. These adjustments are made using balance weights installed inside the blade structure near the tip. The blades typically have leading edge and trailing edge pockets near the tip for housing spanwise and chordwise balance weights. Numerous mechanisms are currently employed in retaining the balance weights in these pockets. These balance weight retention mechanisms usually consist of a housing, one or more balance weights, one or more fastening bolts for securing the balance weights to the housing, and one or more covers that are shaped to match the contour of the rotor blade.

There are several problems associated with conventional balance weight retention systems. In some designs, the pockets in the tip of the rotor blade run completely through the thickness of the rotor blade causing the blade to significantly lose its stiffness and strength. This requires additional structure to make up for the loss of stiffness. In other designs, the threaded shanks of the fastening bolts are subjected to shear loads from balance weights due to the centrifugal force generated by the rotating rotor blades. Higher stresses in the threaded shanks due to high stress concentrations at the root of the threads can lead to failure of the fastening bolts, and, ultimately, failure of the entire balance weight retention mechanism. In yet other designs, fastening studs are provided so that the fastening bolts do not come into contact with the balance weights. However, in these other designs, the balance weights are in contact with the exterior walls of the housing, thereby, transferring the shear load through this interface. This makes the installation and removal of the balance weights more difficult. In most of these conventional balance weight retention systems, precision machining of the pockets in the blade tips is required for proper installation of the housing. This is time consuming, costly, and labor intensive.

Another limitation with conventional balance weight retention mechanisms is that, although they may be useful for new blade construction, they do not provide adequate provisions for rebalancing rotor blades that have undergone patching, reconstruction, repairs, or modifications.

Although great strides have been made in the area of helicopter rotor blade tip balancing, significant shortcomings remain.

SUMMARY OF THE INVENTION

There is a need for a helicopter main rotor balance weight retention assembly in which the threaded portions of the fastening bolts are not subjected to any shear loads from the balance weights due to the centrifugal force generated by the rotating rotor blades, and for which the cavities in the blade tip do not have to be precision machined.

There is also a need for a helicopter main rotor balance weight retention assembly that can be used to balance not only rotor blades of new construction, but rotor blades that have undergone patching, reconstruction, repairs, or modifications.

Therefore, it is an object of the present invention to provide a helicopter main rotor balance weight retention assembly in which the threaded portions of the fastening bolts are not subjected to any shear loads from the balance weights due to the centrifugal force generated by the rotating rotor blades, and for which the pockets in the blade tip do not have to be precision machined.

It is another object of the present invention to provide a helicopter main rotor balance weight retention assembly that can be used to balance not only rotor blades of new construction, but rotor blades that have undergone patching, reconstruction, repairs, or modifications.

The above objects are achieved by providing a helicopter main rotor blade balance weight retention system and assembly having a base plate, at least one support post integral with the base plate and extending out perpendicularly from the base plate, a plurality of balance weights, a retaining nut plate, and one or more fastening bolts for securing the balance weights to the base plate and the base plate to the rotor blade. The balance weights include apertures through which the support posts and the fastening bolts pass. The apertures through which the support posts pass are dimensioned such that the a snug fit is formed between the support posts and the balance weight; but the apertures through which the fastening bolts pass are dimensioned such that the threaded portions of the fastening bolts are not subjected to any shear loads from the balance weights due to the centrifugal force generated by the rotating rotor blades. The weight retention assembly is installed into pockets in the blade tip. The pockets do not have to undergo precision machining to receive and enclose the balance weight retention assemblies. One of the pockets includes an additional balance weight retention assembly in which the balance weights are smaller than the balance weights in the main balance weight retention assembly. This provides an additional means of fine tuning the spanwise and chordwise balance of both new rotor blades, and used rotor blades that have been patched, reconstructed, repaired, or modified.

The present invention provides the following advantages: (1) the threaded portions of the fastener bolts are not subjected to any shear loads from the balance weights due to the centrifugal force generated by the rotating rotor blade; (2) the fastening bolts serve a dual purpose of securing the balance weights to the base plate and the base plate to the rotor blade; (3) only one length of faster bolt is required for various combinations of balance weights; (4) the fastening bolts do not pass through the cover; (5) the cover can be lighter and provide a better fit with the contour of the rotor blade; (6) no spacer shims are required; (7) the pocket in the tip of the rotor blade does not have to pass entirely through the rotor blade; (8) the pocket in the tip of the rotor blade does not require precision machining; and (9) the additional, smaller balance weight retention assembly is easily accessible and provides a means to perform and fine tune spanwise and chordwise balance of the rotor blade after patching, reconstruction, repairs, or modifications.

The above objects and advantages, as well as others, will be evident from the following detailed description and drawings of the present invention.

DESCRIPTION OF THE PREFERRED EMBODIMENT

Figure 1:
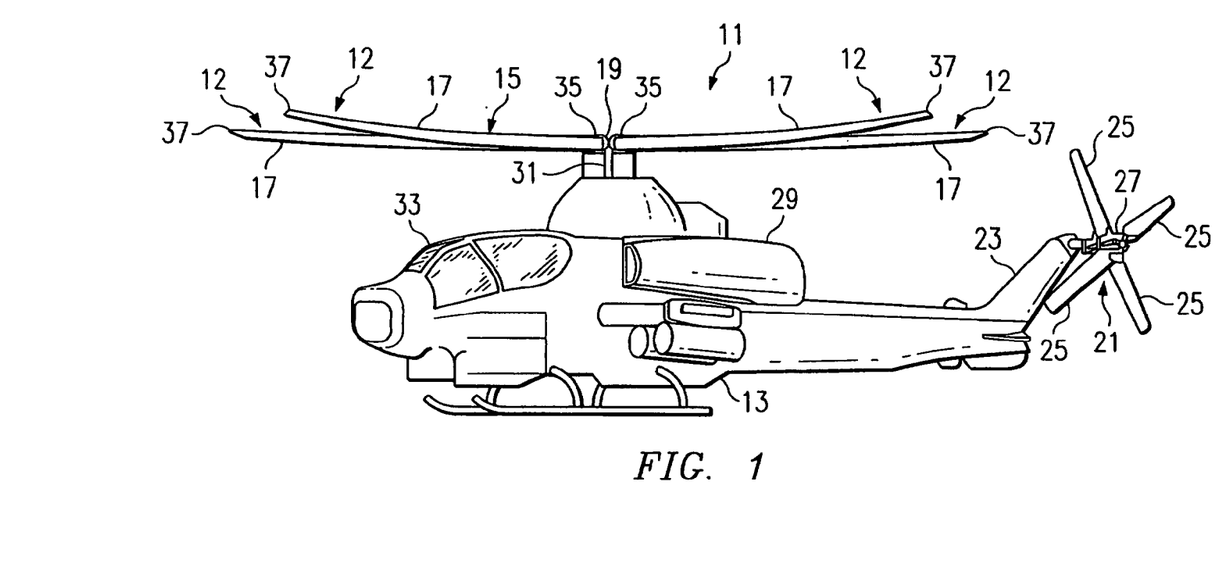
FIG. 1 is a perspective view of a helicopter having a main rotor blade balance weight retention system according to the present invention.

Referring to FIG. 1 in the drawings, a helicopter 11 having a main rotor blade balance weight retention system 12 according to the present invention is illustrated. Helicopter 11 includes a fuselage 13 and a main rotor 15. Main rotor 15 includes a plurality of main rotor blades 17 that are coupled to one or more rotor yokes 19 and a drive mast 31. Torque imparted to fuselage 13 by main rotor 15 is counteracted by a tail rotor 21 carried by a tail portion 23 of fuselage 13. Tail rotor 21 includes a plurality of tail rotor blades 25 that are coupled to a tail rotor hub 27. Main rotor 15 and tail rotor 21 are powered by a drive means 29 under the control of a pilot in a cockpit 33. Each rotor blade 17 has an inboard root end 35 and an opposing outboard blade tip 37. The root end 35 of each rotor blade 17 is coupled to one of rotor yokes 19. One balance weight retention system 12 for selectively providing and adjusting the spanwise and chordwise balance of rotor blade 17 is operably associated with each blade tip 37.

Figure 2:
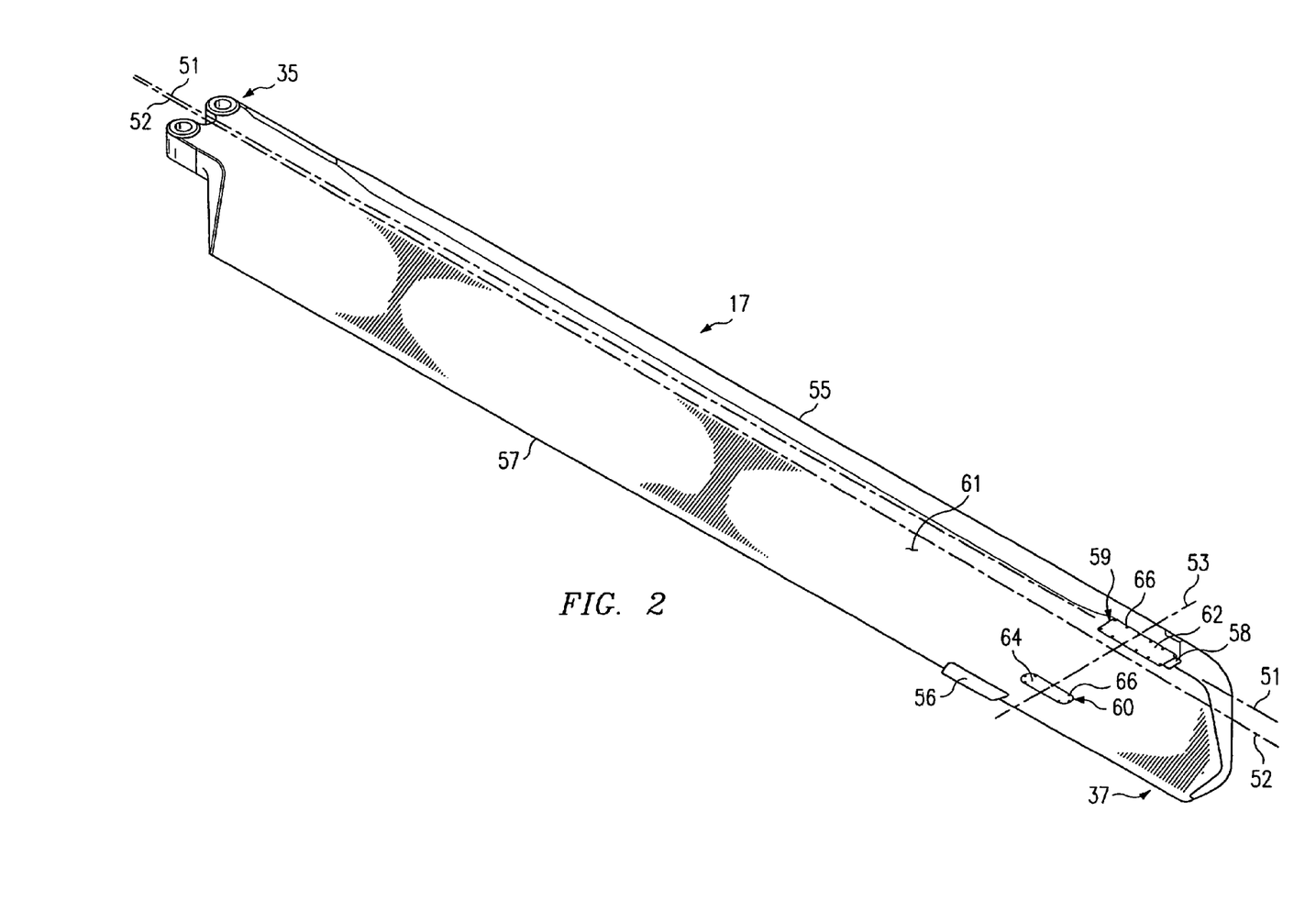
FIG. 2 is a perspective view of a rotor blade of the helicopter of FIG. 1.

Referring now to FIG. 2 in the drawings, one rotor blade 17 of helicopter 11 is shown in a perspective view. Rotor blade 17 includes structures and components, such as spars, ribs, cores, and skins made from composite, honeycomb, and metallic materials. Rotor blade 17 has a pitch change axis 51 that extends in a direction from root end 35 to blade tip 37; a center of twist axis 52 that extends in a direction from root end 35 to blade tip 37; and a chord axis 53, which is generally perpendicular to pitch change axis 51, that extends in a direction from a leading edge 55 of rotor blade 17 to a trailing edge 57 of rotor blade 17. In the preferred embodiment a forward pocket 59 spans pitch change axis 51 and chord axis 53; and an aft pocket 60, which is aft of and generally parallel to forward pocket 59, spans chord axis 53.

Rotor blade 17 includes a self-powered blade tip formation light. This light is preferably constructed of two clear plastic pieces with a self-generating light material, such as tritium-3, disposed therebetween. In order to provide increased capability, a variable intensity blade tip formation light 58 is incorporated on an upper airfoil surface 61 of rotor blade 17. Light 58 is preferably a 28-Volt DC light and can be selectively operated by the pilot in flight. Rotor blade 17 also includes an adjustable trim tab 56 to aid in blade tracking.

Figure 7:
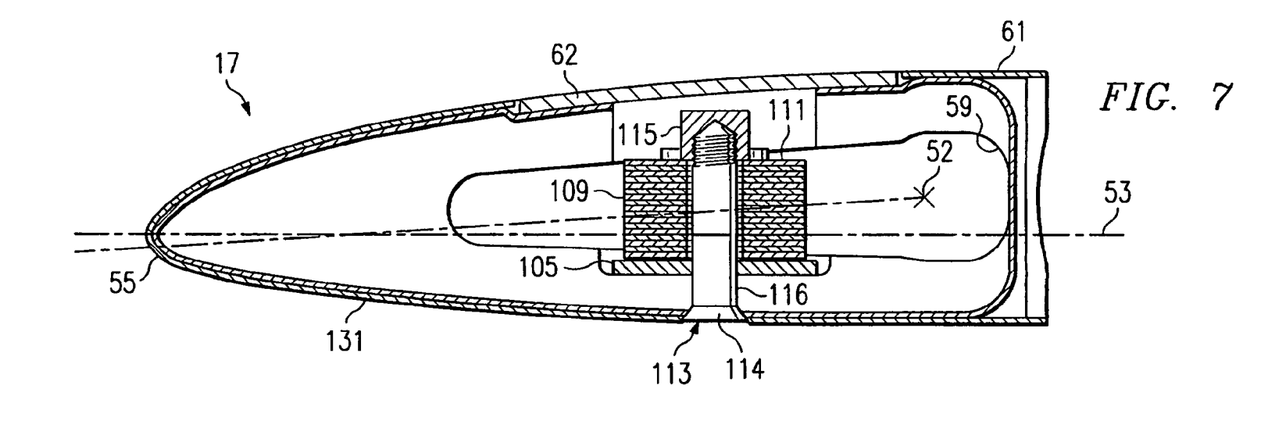
FIG. 7 is a cross-sectional view taken at VII—VII in FIG. 3.

A cover 62 protectively encloses forward pocket 59, and a cover 64 protectively encloses aft pocket 60. Covers 62 and 64 are preferably configured to match the contour of an upper airfoil surface 61. Covers 62 and 64 are preferably made of a metallic material, such as aluminum or steel, and are removably secured to rotor blade 17 by conventional fasteners 66 that are received by conventional metallic inserts (not shown) installed in the composite spars and/or ribs of rotor blade 17. To maintain structural integrity, it is preferred that pockets 59 and 60 extend only partially through rotor blade 17 from upper airfoil surface 61, such that pockets 59 and 60 are only open to upper airfoil surface 61 of rotor blade 17. It should be understood that pockets 59 and 60 may be open to a lower airfoil surface 131 (see FIGS. 7 and 8).

Figure 3:
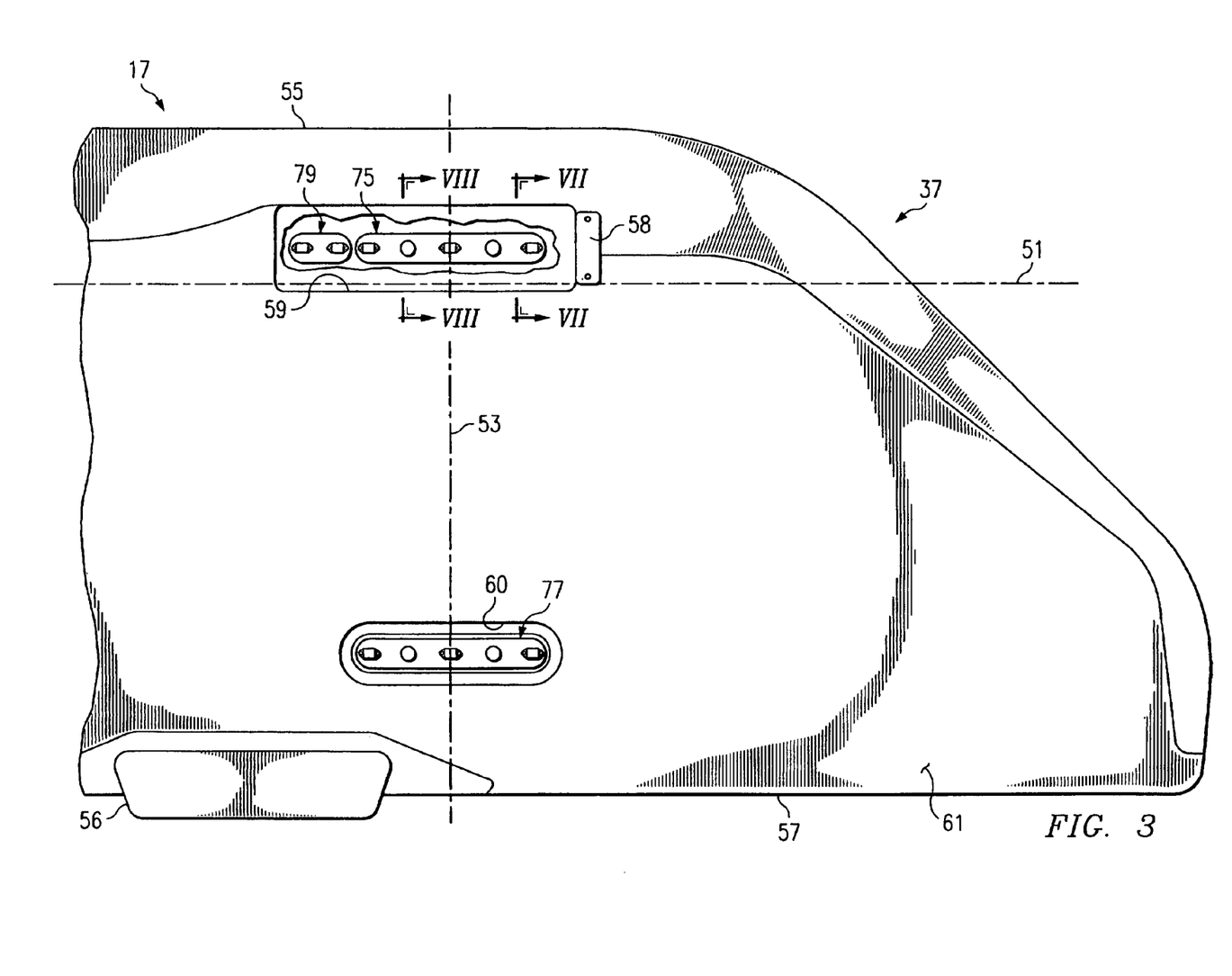
FIG. 3 is an enlarged view of the blade tip of the rotor blade of FIG. 2.

Referring now to FIG. 3 in the drawings, a first balance weight retention assembly 75 is disposed within forward pocket 59, and a second balance weight retention assembly 77 is disposed within aft pocket 60. An additional, smaller, balance weight retention assembly 79 is also disposed within forward pocket 59 to ensure track and balance capability after patching, reconstruction, repairs, or modifications to rotor blade 17. Balance weight retention assembly 79 is preferably adjacent to, aligned with, and inboard of, balance weight retention assembly 75 along pitch change axis 51. Balance weight retention assemblies 75, 77, and 79 allow for both spanwise and chordwise dynamic balancing of rotor blade 17. Because of its smaller size, additional balance weight retention assembly 79 is particularly well suited for fine tuning of the balance of rotor blade 17 after patching, reconstruction, repairs, or modifications to rotor blade 17. Although forward pocket 59 has a generally rectangular shape, and aft pocket 60 has a generally oval shape, it should be understood that pockets 59 and 60 may be of varying geometrical shapes.

Referring now to FIGS. 4–8 in the drawings, balance weight retention assemblies 75 and 77 are preferably similar in form and function. Balance weight retention assemblies 75 and 77 each include a base plate 105, at least one support post 107 integral with base plate 105, at least one balance weight 109, a retaining plate 111, at least one fastening bolt 113, and a nut plate 115 carried by retaining plate 111 for each fastening bolt 113. Fastener bolts 113 preferably include a flush-mount head 114, an unthreaded shank portion 116, and a threaded portion. Nut plates 115 include fastener receivers for matingly receiving the threaded portions of fastener bolts 113.

Figures 4, 5:
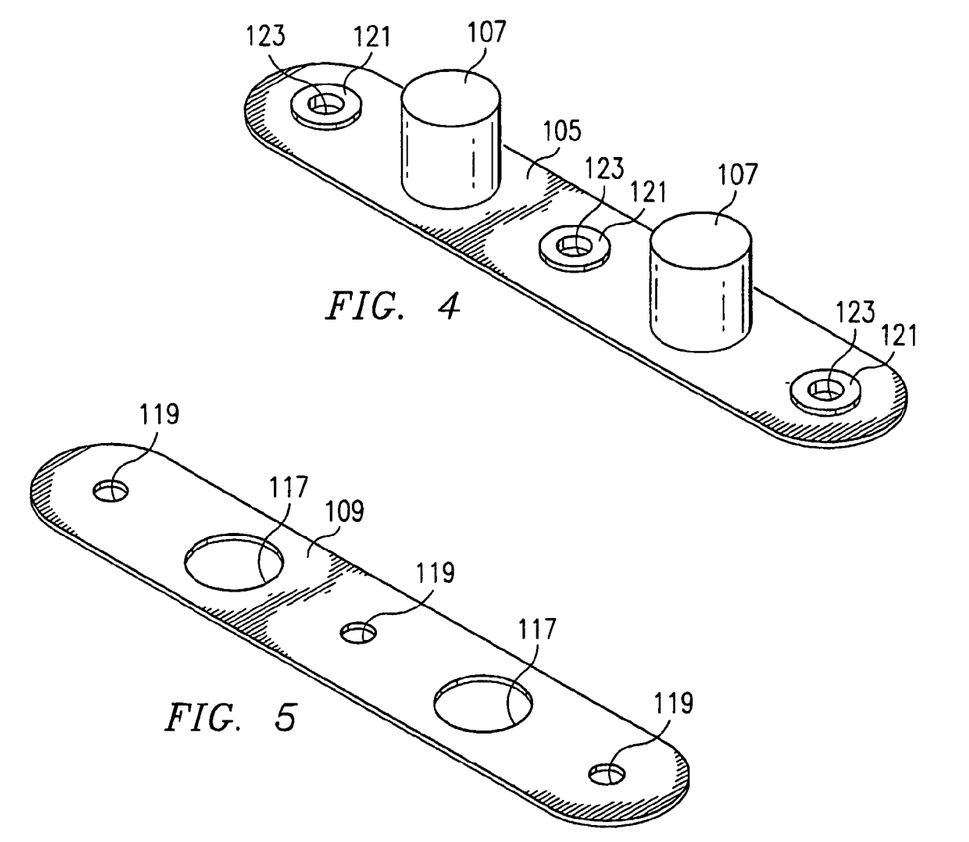
FIG. 4 is an isometric view of a base plate for a balance weight retention assembly according to the present invention.
FIG. 5 is an isometric view of a balance weight for a balance weight retention assembly according to the present invention.
Figure 8:
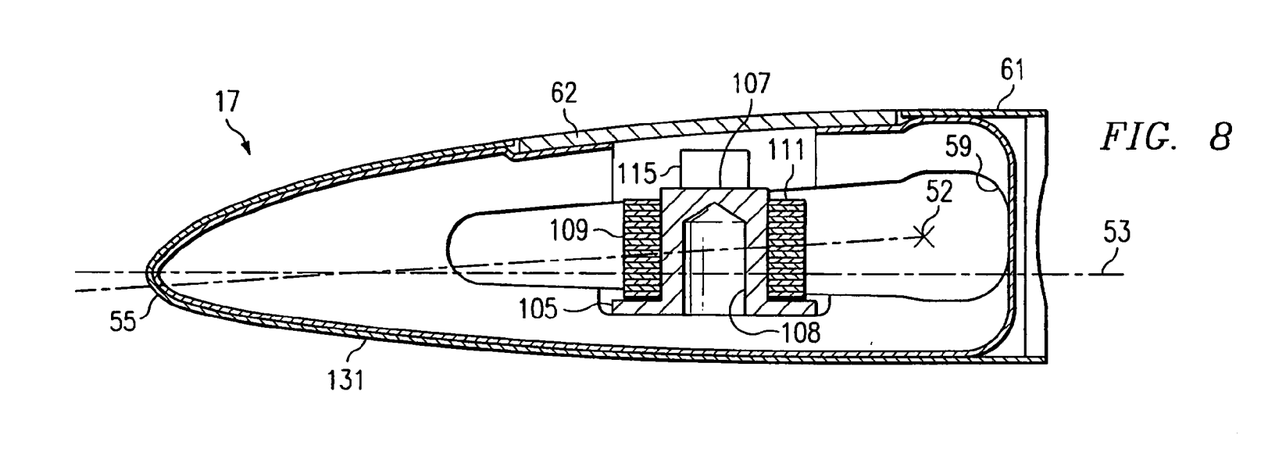
FIG. 8 is a cross-sectional view taken at VIII—VIII in FIG. 3.

Base plate 105 is preferably made of a metallic material, such as aluminum or steel. Support posts 107 are preferably integral with base plate 105 and extend out perpendicularly from base plate 105. As best shown in FIG. 8, support posts 107 may include a hollow cavity 108 to conserve weight. In the preferred embodiment, base plate 105 is bonded to the interior surface of pocket 59 with a conventional adhesive. Balance weights 109 are preferably made of a metallic material, such as steel or tungsten, and are of uniform thickness, preferably 0.050 of an inch. However, some balance weights 109 made be made of lighter material, such as aluminum, and may be of thinner thickness, such as 0.025 of an inch. This variation in material and thickness allows for fine tuning of balance weight retention assemblies 75 and 77. Base plate 105 includes slightly upraised fastener guides 121 for guiding fastener bolts 113 and lifting balance weights 109 slightly away from base plate 105. Fastener guides 121 include apertures 123 through which fastener bolts 113 pass. To aid the bonding of base plate 105 to the interior surface of pocket 59, unthreaded shank portions 116 of fastener bolts 113 may be subjected to some shear load from base plate 105 through fastener guides 121 due to the centrifugal force generated by rotating rotor blade 17.

Balance weights 109 include an aperture 117 for each support post 107 to pass through, and an aperture 119 for each fastening bolt 113 to pass through. It is preferred that a snug fit exist between each support post 107 and each aperture 117, but that a clearance exist between each fastening bolt 113 and each aperture 119. This configuration ensures that all of the shear loads from balance weights 109 due to the centrifugal force generated by rotating rotor blade 17 are transferred to support posts 107, and not to the threaded portions of fastener bolts 113. In addition, a clearance exists between the peripheral edges of balance weights 109 and the interior walls of pockets 59 and 60. This configuration ensures that none of the shear loads from balance weights 109 due to the centrifugal force generated by rotating rotor blade 17 are transferred directly to the interior walls of pockets 59 and 60. This configuration also ensures that pockets 59 and 60 do not have to undergo precision machining to receive and enclose balance weight retention assemblies 75 and 77.

Figure 6:
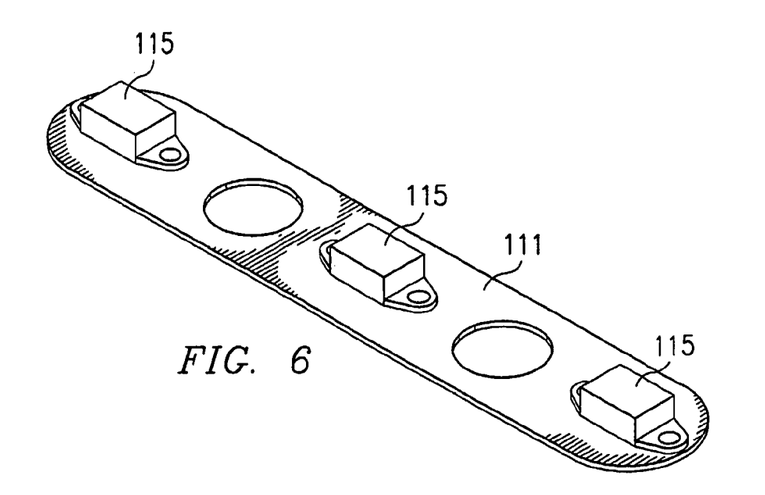
FIG. 6 is an isometric view of a retention plate for a first balance weight retention assembly according to the present invention.

In operation, retaining plate 111 is disposed atop the uppermost balance weight 109. Nut plates 115 are coupled to retaining plate 111 by conventional means, such as rivets or by welding. Nut plates 115 include internal threads to receive the threaded portions of fastening bolts 113. In the preferred embodiment, nut plates 115 may include bosses that extend perpendicularly downward through apertures 119 in balance weights 109 to receive fastener bolts 113.

Balance weight retention assemblies 75 and 77 are assembled by installing base plates 105 into pockets 59 and 60. In the preferred embodiment, base plates 105 are coupled to the interior of pockets 59 and 60, preferably by bonding with a conventional adhesive. Once base plates 105 are installed, balance weights 109 are stacked on top of base plates 105, such that support posts 107 pass through apertures 117 in balance weights 109. As set forth above, it is preferred that a snug fit between support posts 107 and apertures 117 be achieved. After an appropriate number of balance weights 109 have been installed onto base plates 105, retaining plates 111 are installed over posts 107. Then, fastening bolts 113 are passed through aligned apertures in lower airfoil surface 131 (see FIG. 7), through apertures 123 in fastener guides 121, through apertures 119 in balance weights 109, and are fastened to nut plates 115 to provide vertical compression of balance weights 109 and to ensure that balance weights 109 do not move relative to base plate 105 while in operation. Balance weights 109 are added or removed during spanwise and chordwise dynamic balancing by reversing this process.

Figure 9:
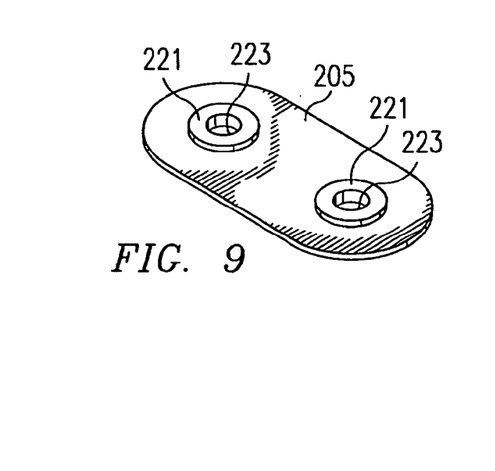
FIG. 9 is an isometric view of a base plate for an additional, smaller balance weight retention assembly according to the present invention.
Figure 10:
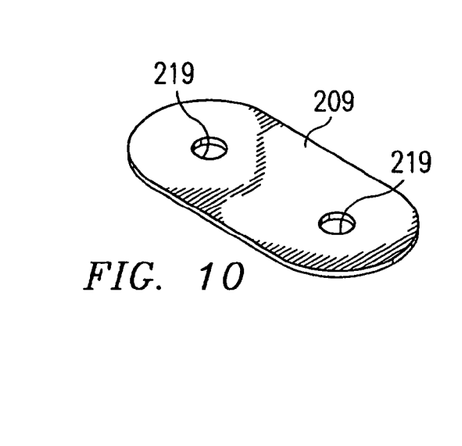
FIG. 10 is an isometric view of a balance weight for an additional, smaller balance weight retention assembly according to the present invention.
Figure 11:
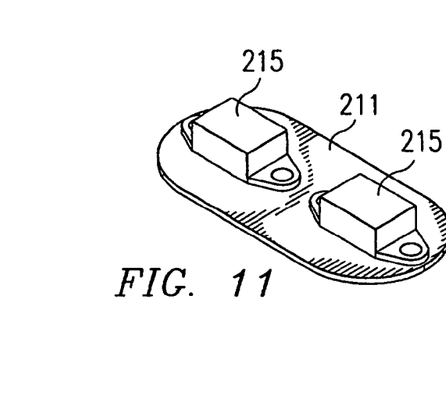
FIG. 11 is an isometric view of a retention plate for an additional, smaller balance weight retention assembly according to the present invention.

Referring now to FIGS. 9–11 in the drawings, balance weight retention assembly 79 is preferably smaller and of slightly different design than balance weight assemblies 75 and 77. Balance weight retention assembly 79 is a fine adjustment balance weight retention assembly and includes a base plate 205, at least one balance weight 209, a retaining plate 211, at least one fastening bolt (not shown, but similar to fastening bolt 113), and a nut plate 215 carried by retaining plate 211 for each fastening bolt. Nut plate 215 is a fastener receiver for matingly receiving the threaded portion of the fastener bolts.

Base plate 205 is preferably made of a metallic material, such as aluminum or steel. In the preferred embodiment, base plate 205 is coupled to the interior surface of forward pocket 59, preferably by bonding with a conventional adhesive. Balance weights 209 are preferably made of a metallic material, such as steel or tungsten, and are of uniform thickness, preferably 0.050 of an inch. However, some balance weights 209 made be made of lighter material, such as aluminum, and may be of thinner thickness, such as 0.025 of an inch. This variation in material and thickness allows for fine tuning of balance weight retention assembly 79. Base plate 205 includes slightly upraised fastener guides 221 for guiding the fastener bolts and lifting balance weights 209 slightly away from base plate 205. Fastener guides 221 include apertures 223 through which the fastener bolts pass.

Balance weights 209 include an aperture 219 for each fastening bolt to pass through. A clearance exists between the peripheral edges of balance weights 109 and the interior walls of pocket 59. This configuration ensures that none of the shear loads from the centrifugal forces generated by rotating rotor blade 17 are transferred directly to the interior walls of pocket 59. This configuration also ensures that pocket 59 does not have to undergo precision machining to receive and enclose balance weight retention assembly 79.

In operation, retaining plate 211 is disposed atop the uppermost balance weight 209 to provide vertical compression of balance weights 209 and to ensure that balance weights 209 do not move relative to base plate 205 while in operation. Nut plates 215 are coupled to retaining plate 211 by conventional means, such as rivets or by welding. Nut plates 215 include internal threads to receive the threaded portions of the fastening bolts. In the preferred embodiment, nut plates 215 may include bosses that extend perpendicularly downward through apertures 219 in balance weights 209 to receive the fastener bolts.

Balance weight retention assembly 79 is assembled by installing base plate 205 into pocket 59. In the preferred embodiment, base plate 205 is bonded to the interior of pocket 59 by a conventional adhesive. Once base plate 205 is installed, balance weights 209 are stacked on top of base plate 205. After an appropriate number of balance weights 209 have been installed onto base plate 205, retaining plate 211 is installed. Then, the fastening bolts are passed through aligned apertures in lower airfoil surface 131 (see FIG. 10), through apertures 223 in fastener guides 221, through apertures 219 in balance weights 209, and are fastened to nut plates 215. Balance weights 209 are added or removed during static spanwise balancing and dynamic chordwise balancing by reversing this process. Because of its smaller size, balance weight retention assembly 79 is well suited for fine tuning during spanwise and chordwise dynamic balancing of rotor blade 17. In particular, balance weight retention assembly 79 is useful for fine tuning during balancing after patching, reconstruction, repairs, or modifications to rotor blade 17.

The present invention provides the following advantages: (1) the threaded portions of fastener bolts 113 are not subjected to any shear loads from balance weights 109 due to the centrifugal force generated by the rotating rotor blade 17; (2) fastener bolts 113 serve a dual purpose of securing balance weights 109 to base plate 105 and base plate 105 to rotor blade 17; (3) only one length of fastener bolt 113 is required for various combinations of balance weights 109; (4) fastener bolts 113 do not pass through covers 60 and 62; (5) covers 60 and 62 can be lighter and provide a better fit with the contour of upper airfoil surface 61 rotor blade 17; (6) no spacer shims are required; (7) pockets 59 and 60 in rotor blade 17 do not have to pass entirely through rotor blade 17; (8) pockets 59 and 60 in rotor blade 17 do not require precision machining; and (9) the additional, smaller balance weight retention assembly 79 is easily accessible and provides a means to perform and fine tune balancing after patching, reconstruction, repairs, or modifications to rotor blade 17.

Although the present invention is shown in a limited number of forms, it is not limited to just these forms, but is amenable to various changes and modifications without departing from the spirit thereof.

The invention claimed is:

1. A rotor blade balance weight retention assembly comprising:
   a base plate adapted for installation within a pocket in a rotor blade having upper and lower airfoil surfaces, the pocket being open to one of the airfoil surfaces;
   at least one support post extending up from the base plate;
   at least one balance weight stacked upon the base plate;
   a retaining plate stacked upon the uppermost balance weight; and
   at least one fastener for coupling the base plate, the balance weights, and the retaining plate together, the fastener passing through the other of the airfoil surfaces;
   wherein the support post prevents the balance weight from contacting the fastener.

2. The rotor blade balance weight retention assembly according to claim 1, further comprising:
   a fastener receiver coupled to the retaining plate for receiving the fastener.

3. The rotor blade balance weight retention assembly according to claim 1, further comprising:
   a cover adapted to enclose the pocket, the cover being configured to match the contour of the rotor blade.

4. The rotor blade balance weight retention assembly according to claim 3, wherein the cover is configured to match the contour of the upper airfoil surface of the rotor blade.

5. The rotor blade balance weight retention assembly according to claim 3, wherein the cover is configured to match the contour of the lower airfoil surface of the rotor blade.

6. A helicopter main rotor balance weight retention system comprising:
   a rotor blade having an inboard root end, an opposing outboard blade tip, a leading edge, an opposing trailing edge, an upper airfoil surface, and an opposing lower airfoil surface;
   a first pocket disposed within the rotor blade at the blade tip; and
   a first balance weight retention assembly disposed within the first pocket comprising:
      a base plate coupled to the rotor blade;
      at least one support post extending perpendicularly from the base plate;
      at least one balance weight stacked upon the base plate, the balance weight having a support aperture aligned with each support post, each support aperture being dimensioned to snugly receive each corresponding support post, and at least one fastener aperture;
      a retaining plate stacked upon the uppermost balance weight for preventing movement of the balance weights relative to the base plate, the retaining plate having a support aperture aligned with each support post, each support aperture being dimensioned to snugly receive each corresponding support post, and at least one fastener receiver;
      at least one fastener for coupling the base plate, the balance weights, and the retaining plate together, the fastener being releasably received by the fastener receiver; and
      a cover releasably coupled to the rotor blade for enclosing the first pocket;
   wherein the first pocket is open to the one of the airfoil surfaces, and the fastener passes through the other of the airfoil surfaces.

7. The helicopter main rotor balance weight retention system according to claim 6, further comprising:
   a fine adjustment balance weight retention assembly disposed within the first pocket, the fine adjustment balance weight retention assembly comprising:
      a base plate coupled to the rotor blade;
      at least one balance weight stacked upon the base plate;
      a retaining plate stacked upon the uppermost balance weight for preventing movement of the balance weights relative to the base plate;
      at least one fastener for coupling the base plate, the balance weights, and the retaining plate together.

8. The helicopter main rotor balance weight retention system according to claim 6, further comprising:
   a second pocket disposed within the rotor blade at the blade tip, the second pocket being located closer to the trailing edge than the first pocket;
   a second balance weight retention assembly disposed within the second pocket, the second balance weight retention assembly comprising:
      a base plate coupled to the rotor blade;
      at least one support post extending perpendicularly from the base plate;
      at least one balance weight stacked upon the base plate, the balance weight having a support aperture aligned with each support post, each support aperture being dimensioned to snugly receive each corresponding support post, and at least one fastener aperture;
      a retaining plate stacked upon the uppermost balance weight for preventing movement of the balance weights relative to the base plate, the retaining plate having a support aperture aligned with each support post, each support aperture being dimensioned to snugly receive each corresponding support post, and at least one fastener receiver;

at least one fastener for coupling the base plate, the balance weights, and the retaining plate together, the fastener being releasably received by the fastener receiver; and a cover releasably coupled to the rotor blade for enclosing the second pocket.

9. The helicopter main rotor balance weight retention system according to claim 8, further comprising:

a fine adjustment balance weight retention assembly disposed within the first pocket, the fine adjustment balance weight retention assembly comprising:

a base plate coupled to the rotor blade;

at least one balance weight stacked upon the base plate;

a retaining plate stacked upon the uppermost balance weight for preventing movement of the balance weights relative to the base plate;

at least one fastener for coupling the base plate, the balance weights, and the retaining plate together.

10. The helicopter main rotor balance weight retention system according to claim 9, wherein the fine adjustment balance weight retention assembly is aligned with the first balance weight retention assembly.

11. The helicopter main rotor balance weight retention system according to claim 10, wherein the fine adjustment balance weight retention assembly is located inboard of the first balance weight retention assembly.

12. A helicopter main rotor balance weight retention system comprising:

a rotor blade having an inboard root end, an opposing outboard blade tip, a leading edge, an opposing trailing edge, an upper airfoil surface, and an opposing lower airfoil surface;

a first pocket disposed within the rotor blade at the blade tip; and a first balance weight retention assembly disposed within the first pocket comprising:

a base plate coupled to the rotor blade;

at least one support post extending perpendicularly from the base plate;

at least one balance weight stacked upon the base plate, the balance weight having a support aperture aligned with each support post, each support aperture being dimensioned to snugly receive each corresponding support post, and at least one fastener aperture;

a retaining plate stacked upon the uppermost balance weight for preventing movement of the balance weights relative to the base plate, the retaining plate having a support aperture aligned with each support post, each support aperture being dimensioned to snugly receive each corresponding support post, and at least one fastener receiver;

at least one fastener for coupling the base plate, the balance weights, and the retaining plate together, the fastener being releasably received by the fastener receiver; and a cover releasably coupled to the rotor blade for enclosing the first pocket;

wherein the first pocket is open to the upper airfoil surface, the fastener passes through the lower airfoil surface, and the cover is configured to match the contour of the upper airfoil surface.

13. A helicopter main rotor balance weight retention system comprising:

a rotor blade having an inboard root end, an opposing outboard blade tip, a leading edge, an opposing trailing edge, an upper airfoil surface, and an opposing lower airfoil surface;

a first pocket disposed within the rotor blade at the blade tip; and a first balance weight retention assembly disposed within the first pocket comprising:

a base plate coupled to the rotor blade;

at least one support post extending perpendicularly from the base plate;

at least one balance weight stacked upon the base plate, the balance weight having a support aperture aligned with each support post, each support aperture being dimensioned to snugly receive each corresponding support post, and at least one fastener aperture;

a retaining plate stacked upon the uppermost balance weight for preventing movement of the balance weights relative to the base plate, the retaining plate having a support aperture aligned with each support post, each support aperture being dimensioned to snugly receive each corresponding support post, and at least one fastener receiver;

at least one fastener for coupling the base plate, the balance weights, and the retaining plate together, the fastener being releasably received by the fastener receiver; and a cover releasably coupled to the rotor blade for enclosing the first pocket;

wherein the first pocket is open to the lower airfoil surface, the fastener passes through the upper airfoil surface, and the cover is configured to match the contour of the lower airfoil surface.

14. A helicopter comprising:

a fuselage;

a drive means carried by the fuselage for actuating a drive mast;

at least one rotor yoke coupled to the drive mast;

a plurality of rotor blades coupled to the rotor yokes, each rotor blade having an inboard root end, an opposing outboard blade tip, an upper airfoil surface, and an opposing lower airfoil surface;

a pocket disposed in the rotor blade at the blade tip, the pocket being open to one of the airfoil surfaces;

a base plate disposed within the pocket and coupled to the rotor blade;

at least one support post extending perpendicularly from the base plate;

at least one balance weight stacked upon the base plate, the balance weight having a support aperture aligned with each support post, each support aperture being dimensioned to snugly receive each corresponding support post, and at least one fastener aperture;

a retaining plate stacked upon the uppermost balance weight for preventing movement of the balance weights relative to the base plate, the retaining plate having a support aperture aligned with each support post, each support aperture being dimensioned to snugly receive each corresponding support post, and at least one fastener receiver;

at least one fastener for coupling the base plate, the balance weights, and the retaining plate together, the fastener passing through the other of the airfoil surfaces and being releasably received by the fastener receiver; and a cover releasably coupled to the rotor blade for enclosing the pocket, the cover being configured to match the contour of the upper airfoil surface.

* * * * *